United States Patent
Atkinson

(10) Patent No.: US 8,677,165 B2
(45) Date of Patent: Mar. 18, 2014

(54) VARIABLY DELAYED WAKEUP TRANSITION

(75) Inventor: Lee Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 841 days.

(21) Appl. No.: 12/918,862

(22) PCT Filed: Dec. 1, 2008

(86) PCT No.: PCT/US2008/085105
§ 371 (c)(1),
(2), (4) Date: Aug. 23, 2010

(87) PCT Pub. No.: WO2009/076079
PCT Pub. Date: Jun. 18, 2009

(65) Prior Publication Data
US 2011/0066868 A1   Mar. 17, 2011

Related U.S. Application Data

(60) Provisional application No. 61/013,155, filed on Dec. 12, 2007.

(51) Int. Cl.
*G06F 1/32* (2006.01)
*G06F 1/00* (2006.01)

(52) U.S. Cl.
USPC .......................................... 713/323; 713/320

(58) Field of Classification Search
USPC .......... 713/300, 320, 322–340; 710/260, 263, 710/267
See application file for complete search history.

(56) References Cited

U.S. PATENT DOCUMENTS

| | | | |
|---|---|---|---|
| 5,414,863 A | 5/1995 | Lee et al. | |
| 5,459,358 A | 10/1995 | Rose | |
| 5,631,952 A | 5/1997 | O'Barr et al. | |
| 5,760,636 A | 6/1998 | Noble et al. | |
| 6,326,825 B1 * | 12/2001 | Walley | 327/160 |
| 6,480,476 B1 * | 11/2002 | Willars | 370/311 |
| 6,489,822 B2 | 12/2002 | Han | |
| 6,614,277 B1 * | 9/2003 | Martini | 327/227 |
| 6,892,315 B1 | 5/2005 | Williams | |
| 7,281,149 B2 | 10/2007 | Atkinson | |
| 2005/0188235 A1 | 8/2005 | Atkinson | |
| 2006/0132109 A1 | 6/2006 | Rodriguez et al. | |
| 2007/0189086 A1 * | 8/2007 | Choi et al. | 365/194 |

OTHER PUBLICATIONS

International Searching Authority, International Search Report and the Written Opinion dated May 29, 2010, pp. 10.

* cited by examiner

*Primary Examiner* — Thomas J Cleary

(57) ABSTRACT

A computing system includes a controller to undergo a variably delayed wakeup transition. The controller is to transition a processing module from an idle state to an active state in response to successive assertions of a wakeup interrupt command. The system includes a variable delay module to vary delay lengths between assertion and execution of each of the successive wakeup interrupt commands during the wakeup transition to substantially cause power supply components to vibrate in a non-periodic manner.

15 Claims, 5 Drawing Sheets

VARIABLY DELAYED WAKEUP TRANSITION

BACKGROUND

In order to reduce power consumption of computer systems and computing devices, central processing units (CPUs) typically transition from an active state into an "idle" state between keystrokes, when the operating system does not have a task that needs execution by the CPU. The active state is known in the ACPI definition as the "C0" state, and the idle state refers to any other state, which consumes less power than the active state, such as "C1," "C2," or "C3" states. Reduced power consumption is desirable because it minimizes operating cost, avoids overheating of the components, increases time between charges, and prolongs the operating lives of batteries.

The idle state is exited when a "wakeup interrupt" occurs in the system. For example, when a peripheral, such as, an audio codec, video controller, USB controller, or storage controller requires attention by the CPU, the peripheral generates an interrupt command and the CPU undergoes a wakeup to transition back into the active state and resumes processor operation to attend to the peripheral. Even when the CPU is not receiving input from a peripheral or a user, the CPU often issues a periodic interrupt command to itself, in order to wake up at periodic intervals, such as every 20 milliseconds or so. Each time the interrupt commands are asserted, the CPU wakes up, updates a few bits, and determines if an application needs attention. If no processor operations are required by the CPU, the CPU returns to the idle mode.

As computing systems have become larger and faster, their power requirements have also increased. In systems with relatively high power requirements, the sudden transition from an idle state to the active state causes an instantaneous current surge to the CPU, and has serious adverse effects on the CPU and its power supply components. Uncontrolled current surge, which is commonly called the load-step current, have been known to result in system lockup and/or a failure of the power supply.

Moreover, the increase in power supply often causes power supply components, such as capacitors, to mechanically vibrate when the current through them changes. In fact, capacitors are especially known to vibrate when the power consumption of a CPU transitions from low power states, such as an idle state, to higher power states, such as an active state. The magnitude of vibration is exacerbated by the need for a plurality of power supply components, such as, multiple capacitors, which are generally always used in CPUs currently produced.

The plurality of power supply components used in today's computing systems will not only vibrate, but together will vibrate in phase at the frequency of the wakeup interrupt. That is, because interrupt commands are asserted and executed at regular periodic intervals, the power supply components vibrate at those regular periodic intervals. This, in turn, causes the printed circuit board (PCB) to vibrate because it is attached to the power supply components, thereby causing the PCB to act like a sounding board and produce an audible tone, which is commonly referred to as "singing capacitors." The tone is typically noticeable and therefore, becomes an undesirable source of distraction and annoyance to the user.

FIG. 1 shows a timing diagram 100 of a representative time period during regular periodic transitions from the active and idle states in a conventional computing system. The upper graph of FIG. 1 shows times when wakeup interrupt commands 102 are asserted to cause a CPU to wakeup or return to the active (C0) state. FIG. 1 shows the assertion of five periodic wakeup interrupt commands 102, labeled A-E. The lower graph shows the CPU execution 104 of the wakeup interrupt commands 102 along the same timeline. The baseline of the CPU execution 104 graph indicates that the CPU is in an idle state, while the elevated bars of the CPU execution 104 graph indicate times when the CPU executes the interrupt commands 102 to transition to the active (C0) state and, thus, is consuming considerable power. Upon completion of the processor task, the operating system will execute a processor "idle" instruction and the CPU will return to an idle state and consume relatively less power.

The letters "$T_d$" between the upper and lower graph stand for time delay, signifying that there is a slight time delay between the time when each of the wakeup interrupt commands 102 is asserted and the time when the interrupt commands 102 are actually executed. As FIG. 1 shows. In current wakeup processes, a uniform time delay exists between the time when an interrupt command is asserted (A-E) and the time when the interrupt command is executed. That is, the time delay ($T_d$) between the assertion of each of the interrupt commands 102, labeled A-E, and the execution of each of the interrupt commands 102 by the CPU is always the same duration of time. Since the interrupt source may serve the purpose of filling a fixed length memory buffer or processing a certain task, the interrupt source is often periodic. The periodic wakeup resulting from the periodic interrupt source typically accumulates as an audible noise with an identifiable frequency.

It would, therefore, be desirable to be able to transition from an idle state to an active state without suffering from the drawbacks associated with conventional techniques.

BRIEF DESCRIPTION OF THE DRAWINGS

Features of the present invention will become apparent to those skilled in the art from the following description with reference to the figures, in which.

DETAILED DESCRIPTION

Figure 1:
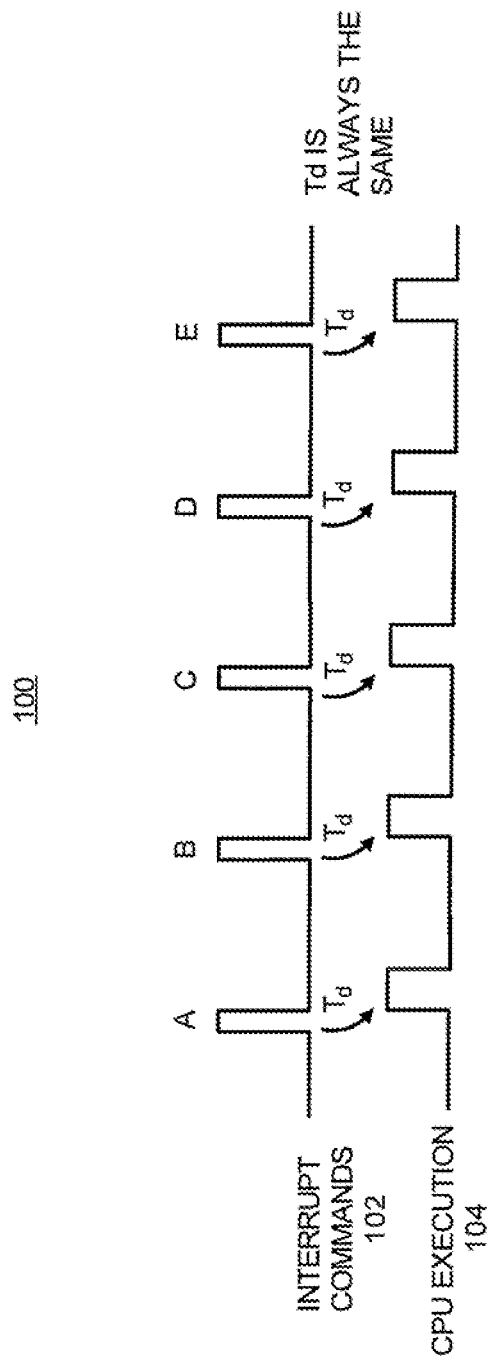
FIG. 1 illustrates a timing diagram of a representative time period during regular periodic transitions from the active and idle states in a conventional computing system.

For simplicity and illustrative purposes, the present invention is described by referring mainly to exemplary embodiments. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Disclosed herein are embodiments of systems and methods for applying a variable interrupt delay to a processing module to cause power supply components of a computing system to vibrate in a non-periodic manner during periodic transitions from the active to the idle states of the processing module. The terms "computing system" refer to any computer or computing device having an integrated circuit, such as, a CPU of a desktop computer, a server, a laptop computer, etc.

The terms "power supply components" refer to devices used by a computing system for the transfer of power from a power source, such as, a battery or wall outlet, to a processing module of the computer system, where the power is used to drive the higher level functions of the computing system. For example, power supply components include capacitors, inductors, etc.

As set forth above, many computing systems are configured to transition from an active state to an idle state when there is no work requirement for a processing module of the computing system, such as, between keystrokes. An "active state" is a state in which a computing system is operable to perform the normal processing functions for which the computing system was designed and, thus, draw the maximum amount of power needed to perform those functions. For example, the active state includes the "G0(S0) working" state, the "D0 fully-on" state, and the "C0 operating state" in the advanced configuration and power interface (ACPI) specification.

During a transition process from an idle state to the active state, power is surged through the power supply components and delivered to the processing module. As described above, conventionally, a series of wakeup interrupt commands are often asserted and executed at regular periodic intervals of time, with a constant delay in time ($T_d$) between assertion and execution of the wakeup interrupt commands. Because the interrupt commands are executed in a regular and repeating pattern, the power supply components tend to vibrate in a periodic manner, which often results in a noticeable and therefore, undesirable source of distraction.

The term "periodic" refers to the time it takes for an event to repeat itself. Here, the power supply components vibrate at a substantially regular, or constant, frequency, because the interrupt commands are being executed following a regular and repeating pattern. This substantially regular and periodic vibration creates a sound that is typically audible to users around the computing systems. In addition, most computer systems utilize multiple power supply components which may all vibrate at a substantially regular periodic frequency when power is surged through these components, thereby increasing the sound level.

According to an embodiment, a variable delay is applied between assertion of a wakeup interrupt command and execution of the wakeup interrupt command to substantially reduce or prevent periodic vibration of the power supply components, and thus the noise resulting from the periodic vibration. The phrase "variable delay" generally refers to a series of durations of time that are non-uniform with respect to other durations of time in the series. In one respect, a "variable delay" includes a first duration of time in the series and a second duration of time in the series, where the first duration of time and the second duration of time differ with respect to each other. In another respect, a "variable delay" includes a first duration of time, a second duration of time, and a third duration of time in the series, in which the first duration differs from both the second duration and the third duration, and in which the difference in durations between the first, second and third durations is non-uniform.

Thus, the delay in execution of a first wakeup interrupt command differs from the delay in execution of a second wakeup interrupt command. In addition, or alternatively, the delay in execution of the first wakeup interrupt command differs from both the delays of a second and a third wakeup interrupt command and the difference in delays are non-uniform with respect to each other.

The application of variable delays generally causes the power supply components to vibrate in a non-periodic manner, thereby substantially reducing the noise caused by the power supply components during periodic transitions from the active and the idle states as compared with conventional systems.

For example, if delays having two different durations of time are implemented, the power supply components will vibrate at two distinct frequencies and will thus remain decoupled from each other. That is, if a first delay is 100 microseconds, a second delay is 200 microseconds, a third delay is 100 microseconds, and so on, the power supply components will vibrate at two different frequencies corresponding to each delay time. As such, the audible strength of the vibration is halved because the energy is split between the two frequencies.

Moreover, as set forth above, any reasonably suitable number of different delay times may be used during a periodic transition from the active and the idle states. In addition, the duration of the delays may be pseudorandomly selected. The term "pseudorandom", as used herein, encompasses substantially random durations of time because truly random events are difficult to create. Therefore, the term "pseudorandom" encompasses dissimilar time periods that do not follow a simple repeating pattern. Applying the variable delays using pseudorandomly selected time periods may further reduce the audible energy of the vibrating power supply components.

Figure 2:
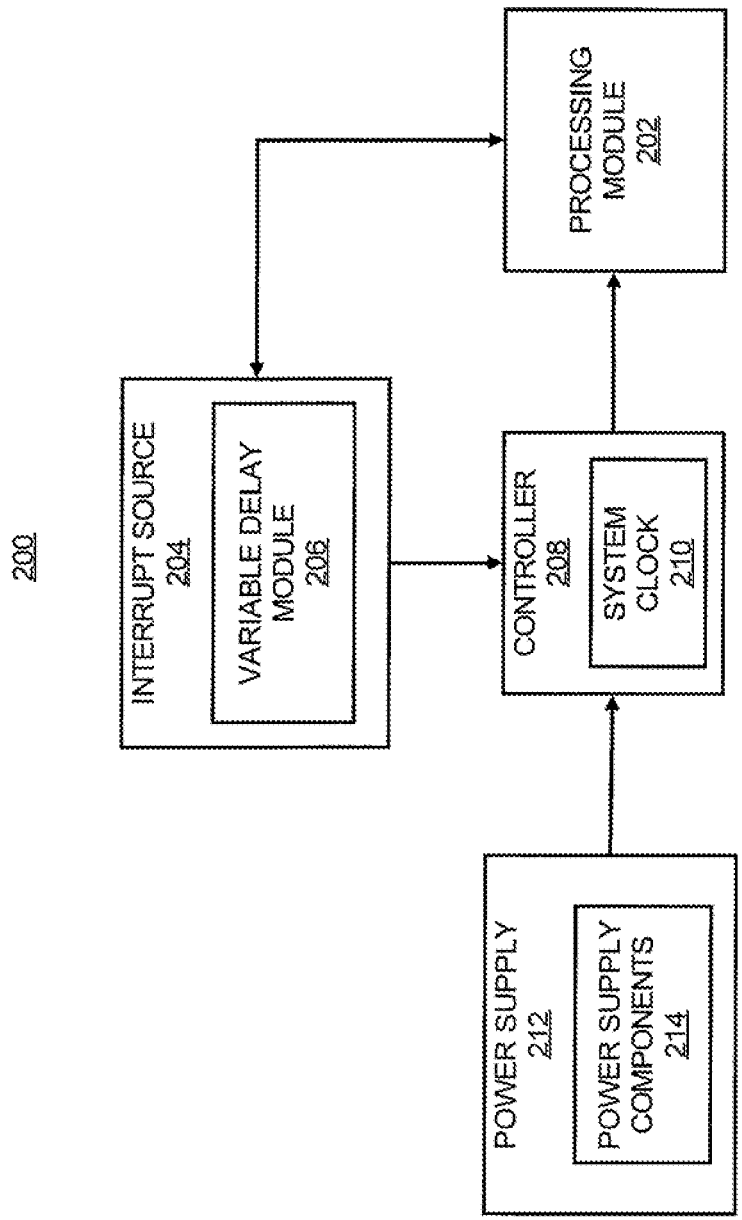
FIG. 2 illustrates a computing system configured to apply variable time delays between assertion and execution of a wakeup interrupt command during periodic transitions from the active and idle states of a processing module, according to an embodiment of the invention.

With reference to FIG. 2, there is shown a simplified block diagram of a computing system 200 configured to apply variable time delays between assertion and execution of a wakeup interrupt command during periodic transitions from the active and idle states of a processing module, according to an embodiment. It should be understood that the following description of the computing system 200 is but one manner of a variety of different manners in which such a computing system 200 may be configured. In addition, it should be understood that the computing system 200 may include additional elements and devices not shown in FIG. 2 and that some of the features described herein may be removed and/or modified without departing from a scope of the computing system 200.

The computing system 200 includes a processing module 202, an interrupt source 204, a controller 208, and a power supply 212. The processing module 202 comprises hardware or a combination of hardware and software and/or firmware, which requires power, such as, an electric current, to operate. For example, the processing module 202 may include a processing circuit, such as an application specific integrated circuit (ASIC), a video controller, etc. The processing module 202 may also comprise a plurality of hardware and software components, such as a CPU.

The interrupt source 204 comprises hardware and/or software for at least asserting a wakeup interrupt command causing the processing module 202 to wakeup. In addition, the interrupt source 204 may include a sequencer and/or a scheduler. As set forth above, the wakeup interrupt command facilitates a wakeup transition by instructing the processing module 202 to transition from an idle state to an active state. The interrupt source 204 may assert a series of interrupt commands to interrupt the idle state of the processing module 202. The interrupt commands may be asserted at uniform or non-uniform time intervals and may be equivalent to the de-assertion of a stopclock command.

The interrupt source 204 may also facilitate the transition of the processing module 202 into an idle state by any reasonably suitable known means. For example, if a predetermined period of inactivity is detected, such as, between keystrokes, the interrupt source 204 may issue a stopclock signal to the controller 208, which is responsible for controlling the activity of the processing module 202. While the controller 208 is depicted as being separate from the processing module 208 and the interrupt source 204, one or more of these components may be integrated without departing from a scope of the computing system 200.

In any regard, the controller 208 is depicted as including a system clock 210, which governs the operation of the processing module 202. The controller 208 is operable to disconnect the processing module 202 from the system clock 210 under various circumstances, such as receipt of a stopclock signal from the interrupt source 204. When disconnected from the system clock 210, the processing module 202 may enter an idle state.

As also shown in FIG. 2, the processing module 202 draws power from the power supply 212. The power supply 212 may include any reasonably suitable AC or DC power source, such as a battery, wall outlet, generator, etc. The power supply 212 includes power supply components 214, which comprise devices through which power flows as the power is supplied to the processing module 202. For example, the power supply components 214 may include capacitors, inductors, etc.

While in an idle state, the processing module 202 draws relatively less power from the power supply 212 as compared with the active state. As such, when a wakeup interrupt command is executed, the processing module 202 requires additional power from the power supply 212 to transition from the idle state to the active state. During the transition, power may surge through the power supply components 214 as the power is delivered to the processing module 202, thereby causing the power supply components 214 to vibrate at a periodic frequency.

According to an embodiment, a variable delay module 206 may be implemented or executed to substantially prevent the power supply components 214 from vibrating at a periodic frequency during the power surge encountered during a wakeup transition. The variable delay module 206 may comprise hardware, software, firmware, or a combination thereof. While shown in FIG. 2 as a component of the interrupt source 204, the variable delay module 206 may be an integrated component of the controller 208 or another device, as described in greater detail below with respect to FIG. 4.

Generally speaking, the variable delay module 206 introduces a variable delay during a wakeup transition from an idle state to the active state. During the wakeup transition, a wakeup interrupt command is asserted to interrupt the idle state of the processing module 202. The variable delay module 206 creates a delay between the assertion of the wakeup interrupt command and the execution of the wakeup interrupt command by the processing module 202 at variable time intervals. For example, Instead of an immediate execution of an interrupt command, the variable delay module 206 creates a first delay between assertion of a first wakeup interrupt command and execution of the first wakeup interrupt command during a first time period and creates a second delay between assertion of a second wakeup interrupt command and execution of the second wakeup interrupt command during a second time period. The first and second time periods comprise different durations of time. In an embodiment, the first and second time periods may be selected in a pseudorandom manner.

The variable delay module 206 may delay the execution of the wakeup interrupt command through any reasonably suitable means. For example, the variable delay module 206 may couple a timing command with the wakeup interrupt command. The timing command may instruct the controller 208 to delay the execution of the wakeup interrupt command for a specified duration of time. In another embodiment, the processing module 202 itself may be programmed to execute wakeup interrupt commands after variable length delays.

Figure 3:
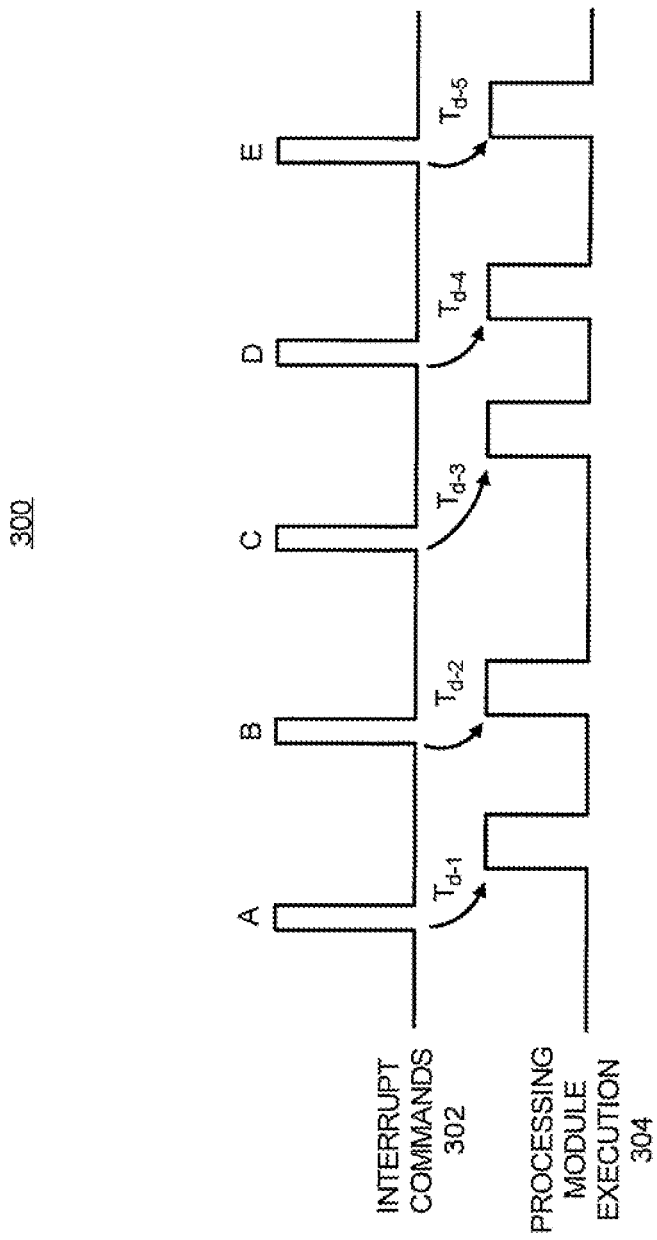
FIG. 3 illustrates a timing diagram of a representative time period during transitions from the active and idle states of a processing module in which variable length time delays are implemented between assertion of wakeup interrupt commands and execution of the wakeup interrupt commands, according to an embodiment of the invention.

With respect now to FIG. 3, there is shown a timing diagram 300 of a representative time period during transitions from the active and idle states of a processing module in which variable length time delays are implemented between assertion of wakeup interrupt commands and execution of the wakeup interrupt commands, according to an embodiment. It should be understood that the following description of the timing diagram 300 is but one manner of a variety of different manners in which such a timing diagram 300 may be configured. In addition, it should be understood that the time periods depicted in the timing diagram 300 may be different than what is shown in FIG. 3 without departing from a scope of the timing diagram 300.

FIG. 3 is similar to FIG. 1, in that, FIG. 3 shows an upper graph where a series of interrupt commands 302 are asserted and a lower graph corresponding to the same timeline as the upper graph. The lower graph shows the execution 304 of the interrupt commands 302 by a processing module 202. The letters A-E each represent the assertion of a respective wakeup interrupt command. As FIG. 3 shows, the wakeup interrupt commands 302, labeled A-E, may be asserted in a substantially uniform (or periodic) manner having substantially equivalent time periods between assertion of each of the interrupt commands A-E. However, in other embodiments, the wakeup interrupt commands 302 may be asserted at non-uniform durations of time. Thus, the baseline of the lower graph showing the execution 304 of the wakeup interrupt commands A-E represents times when a processing module is in an idle state and the elevated bars indicate times with the processing module executes the wakeup interrupt commands 302 to transition to the active (C0) state.

When the wakeup interrupt command A is asserted, the processing module 202 executes the wakeup interrupt command, as shown by the arrow below the wakeup interrupt command A. However, execution of the wakeup interrupt command A is delayed by a first time period, designated as $T_{d-1}$. Similarly, execution of each of the subsequent wakeup interrupt commands B-E is delayed by a time period of $T_{d-2}$, $T_{d-3}$, $T_{d-4}$, $T_{d-5}$, respectively. One or more of the interrupt delays $T_{d-1}$, $T_{d-2}$, $T_{d-3}$, $T_{d-4}$, and $T_{d-5}$ may comprise different durations of time as compared with the other interrupt delays. Therefore, the length of time following assertion of the wakeup interrupt commands and execution of the wakeup interrupt commands may differ for each execution of the wakeup interrupt commands.

In addition, as also shown in FIG. 3, the interrupt delays $T_{d-1}$, $T_{d-2}$, $T_{d-3}$, $T_{d-4}$, and $T_{d-5}$ do not follow a regular pattern as successive interrupt delays $T_{d-1}$, $T_{d-2}$, $T_{d-3}$, $T_{d-4}$, and $T_{d-5}$ are executed. That is, for instance, successive interrupt delays are not increased by the same length nor are they decreased by the same length. As another example, successive interrupt delays may not be increased or decreased in a regular pattern.

Execution of the wakeup interrupt commands A-E is delayed at varied lengths of time due to the variable time delays. This results in a non-periodic vibration in the power supply components 214 and the acoustic energy caused by the wakeup transition is reduced. That is, the spectrum of the vibration frequencies of the power supply components 214 are spread between at least two different frequencies.

The variable lengths of time between assertion and execution of the wakeup interrupt commands during the wakeup transition may comprise any reasonably suitable durations. For example, the variable delays may vary in length between about 15 microseconds and about 1 millisecond in duration. While the time period $T_{d-1}$ is shown in FIG. 3 as being substantially longer than the time period $T_{d-2}$ the time periods of the delays may have any reasonably suitable duration with respect to each other. For example, the time period $T_{d-2}$ may be longer than the time period $T_{d-1}$.

Moreover, the time periods of the interrupt delays $T_{d-1}$, $T_{d-2}$, $T_{d-3}$, $T_{d-4}$, and $T_{d-5}$ may have different patterns or no pattern at all. For example, the durations of the interrupt delays $T_{d-1}$, $T_{d-2}$, $T_{d-3}$, $T_{d-4}$, and $T_{d-5}$ may be pseudorandomly selected. In another embodiment, the durations of the interrupt delays $T_{d-1}$, $T_{d-2}$, $T_{d-3}$, $T_{d-4}$, and $T_{d-5}$ may oscillate back and forth between relatively shorter and longer durations of time. For example, $T_{d-1}$ may comprise a relatively short duration of time, while the adjacent interrupt delay $T_{d-2}$ may comprise a relatively longer duration of time, as compared to $T_{d-1}$. In this example, the third interrupt delay $T_{d-3}$ may then oscillate back to a relatively shorter duration of time as compared to the interrupt delay $T_{d-1}$.

In addition, or alternatively, one or more of the interrupt delays $T_{d-1}$, $T_{d-2}$, $T_{d-3}$, $T_{d-4}$, and $T_{d-5}$ may be substantially equivalent with one or more of the other interrupt delays $T_{d-1}$, $T_{d-2}$, $T_{d-4}$, $T_{d-4}$, and $T_{d-5}$, so long as the not all of the interrupt delays $T_{d-1}$, $T_{d-2}$, $T_{d-3}$, $T_{d-4}$, and $T_{d-5}$ are equivalent or follow a regular pattern. In this manner, a period vibration in the power supply components 214 is avoided and the noise produced as a result of the vibration is substantially reduced or eliminated. The wakeup transition may include as many interrupt commands as desired until the computing system is transitioned to a fully active state. That is, any reasonably suitable number of interrupt commands may be asserted, delayed, and executed in response to a single wakeup interrupt command.

Figure 4:
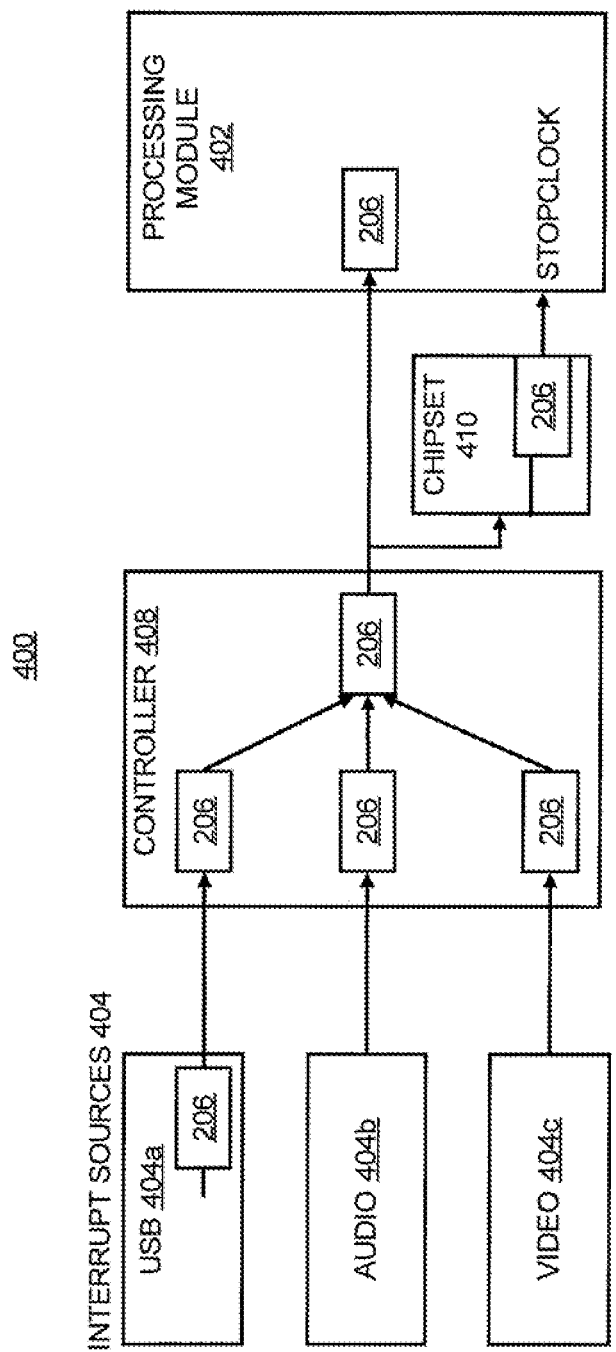
FIG. 4 illustrates a simplified block diagram of a computing system 400 showing various locations in which the variable delay module described with respect to FIG. 2 may reside, according to an embodiment of the invention.

With reference now to FIG. 4, there is shown a simplified block diagram of a computing system 400 showing various locations in which the variable delay module 206 described above with respect to FIG. 2 may reside, according to an embodiment. It should be understood that the following description of the computing system 400 is but one manner of a variety of different manners in which such a computing system 400 may be configured. In addition, it should be understood that the computing system 400 may include additional elements and devices not shown in FIG. 4 and that some of the features described herein may be removed and/or modified without departing from a scope of the computing system 400.

The computing system 400 includes a processing module 402, typical interrupt sources 404a-404c, a controller 408, which may be similar to the corresponding components described above with respect to FIG. 2. The computer system 400 shows various locations where hardware, software, and/or firmware configured to facilitate the performance of one or more of the functions of the variable delay module 206 may reside. Therefore, as FIG. 4 shows, the variable delay module 206 may reside in the interrupt sources 404, which include a USB 404a devices, audio 404b devices, and video 404c devices.

The variable delay module 206 may also reside in the controller 408. That is, the controller 408 may receive wakeup interrupt commands from any of the interrupt sources 404. Similarly, the processing module 402 may also contain the variable delay module 206.

The computing system 400 is also depicted as including a chipset 410, which is a specialized group of computer chips or integrated circuits designed to function together for a common purpose. For example, the chipset 410 may control communications between the processing module 402 and external devices, such as the interrupt sources 404. The chipset 410 may also contain the variable delay module 206 and may issue stopclock commands to the processing module 402.

Figure 5:
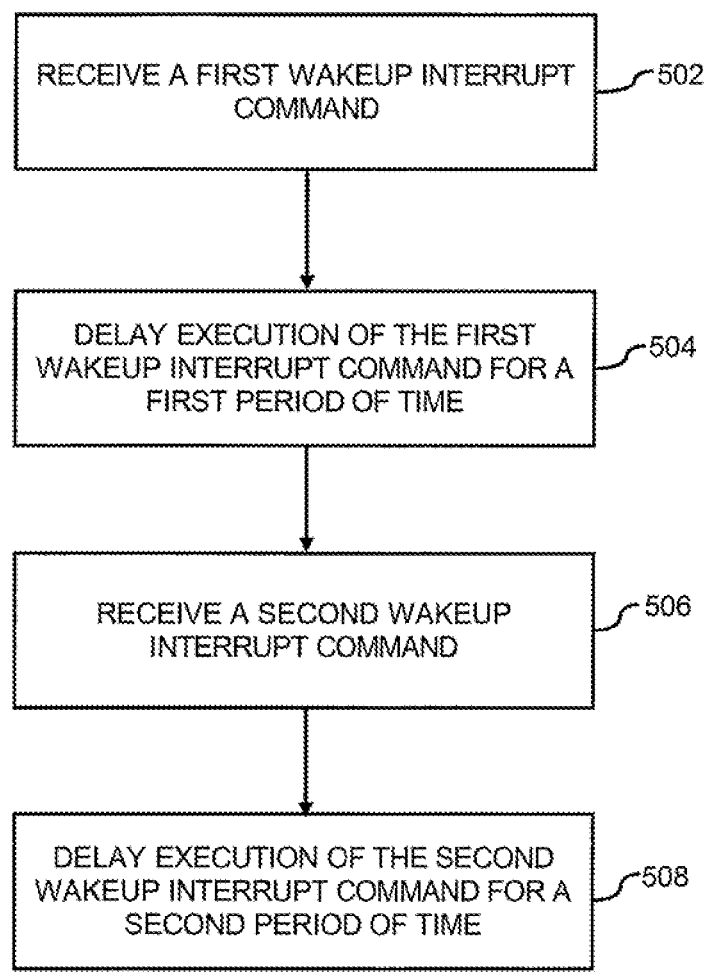
FIG. 5 illustrates a flow chart of a method for variably delaying execution of a wakeup interrupt command during periodic transitions from the active to the idle states of a processing module following assertion of the wakeup interrupt command to cause power supply components to vibrate at a non-periodic frequency, according to an embodiment of the invention.

Turning now to FIG. 5, there is shown a flow diagram of a method 500 for variably delaying execution of a wakeup interrupt command during periodic transitions from the active to the idle states of a processing module following assertion of the wakeup interrupt command to cause power supply components 214 to vibrate at a non-periodic frequency, according to an embodiment. It is to be understood that the following description of the method 500 is but one manner of a variety of different manners in which an example of the invention may be practiced. It should also be apparent to those of ordinary skill in the art that the method 500 represents a generalized illustration and that other steps may be added or existing steps may be removed, modified or rearranged without departing from a scope of the method 500.

The description of the method 500 is made with reference to the computing system 200 and the timing diagram 300 illustrated in FIGS. 2 and 3, respectively, and thus makes reference to the elements cited therein. It should, however, be understood that the method 500 is not limited to the computing system 200 and the timing diagram 300. Instead, it should be understood that the method 500 may be used with systems having a different configuration than the system 200 set forth in FIG. 2 and that a non-periodic vibration may be created using time period delays other than the time period delays shown in FIG. 3.

The method 500 may be activated at step 502, where a first wakeup interrupt command A is received. At step 504, execution of the first wakeup interrupt command A is delayed by a first period of time. For example, the variable delay module 206 may issue a command to delay execution of the first wakeup interrupt command A during the first period of time.

At step 506, a second wakeup interrupt command B is received. The second wakeup interrupt command B may be configured to interrupt the wakeup transition process for a relatively brief period of time, similarly to the first wakeup interrupt command A.

At step 508, execution of the second wakeup interrupt command B is delayed for a second period of time. The first and second periods of time comprise different durations of time.

Steps 502-508 may be repeated for any number of wakeup interrupt commands, which may be asserted at regular periodic intervals of time. For instance, steps 502-508 may be repeated in a substantially continuous manner during operation of a processing module 202.

One or more of the steps described herein are operable to be implemented as software or firmware stored on a computer readable storage medium, and executed by a processing circuit. For example, the steps may be embodied by a computer program, which may exist in a variety of forms both active and inactive. For example, they may exist as software and/or firmware program(s) comprised of program instructions in source code, object code, executable code or other formats for performing some of the steps. The codes described above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

What has been described and illustrated herein are preferred examples of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims and their equivalents in which all terms are meant in their broadest reasonable sense unless otherwise indicated.

What is claimed is:

1. A computing system to undergo a variably delayed wakeup transition, said computing system comprising:
   a controller to transition a processing module from an idle state to an active state;
   a power supply having power supply components, wherein the power supply is to provide power to the processing module during the transition from the idle state to the active state; and
   a variable delay module to:
   receive a wakeup interrupt command;
   determine a variable delay length between an assertion of the wakeup interrupt command and an execution of the wakeup interrupt command; and
   execute the wakeup interrupt command after expiration of the variable delay length to cause the power supply components to vibrate in a non-periodic manner.

2. The computing system of claim 1, wherein the variable delay module varies the transition of the processing module by causing the power supply components to undergo at least two different vibration frequencies.

3. The computing system of claim 1, wherein the variable delay module is to delay execution of a first wakeup interrupt command for a first time period and to delay execution of a second wakeup interrupt command for a second time period, wherein at least the first time period and the second time period comprise different durations of time.

4. The computing system of claim 1, wherein the variable delay module is to vary the delay between the assertion of the wakeup interrupt commands and the execution of each of the wakeup interrupt commands at pseudorandomly selected intervals of time and oscillating intervals of time.

5. The computing system of claim 1, further comprising:
   an interrupt source to assert a control signal to instruct the controller to transition the processing module from the active state to the idle state and further to de-assert the control signal to allow the controller to transition the processing module from the idle state to the active state.

6. The computing system of claim 5, wherein the variable delay module resides in at least one of an interrupt source, the controller, a chipset, and the processing module.

7. The computing system of claim 1, further comprising:
   a system clock to control the processing module, wherein the processing module is to be transitioned into the idle state through a disconnection of the processing module from the system clock.

8. A method for transitioning a processing module of a computing system from an idle state to an active state, said method comprising:
   receiving a first wakeup interrupt command to interrupt the idle state of the processing module;
   determining a first delay length between receipt of the first wakeup interrupt command and execution of the first wakeup interrupt command;
   delaying execution of the first wakeup interrupt command until the first delay length has expired;
   executing the first wakeup interrupt command;
   receiving a second wakeup interrupt command to interrupt the idle state of the processing module;
   determining a second delay length between receipt of the second wakeup interrupt command and execution of the second wakeup interrupt command;
   delaying execution of the second wakeup interrupt command until the second delay length has expired; and
   executing the second wakeup interrupt command, wherein the first and second delay lengths comprise different durations of time, such that power supply components of the computing system vibrate at a non-periodic frequency.

9. The method of claim 8, wherein the first delay length and the second delay length are pseudorandomly selected intervals of time.

10. The method of claim 8, further comprising:
    receiving a third wakeup interrupt command to interrupt the idle state of the processing module;
    determining a third delay length between receipt of the third wakeup interrupt command and execution of the third wakeup interrupt command;
    delaying execution of the third wakeup interrupt command until the third delay length has expired; and
    executing the third wakeup interrupt command, wherein the first, second, and third delay lengths comprise different durations of time.

11. The method of claim 10, further comprising:
    delaying the first, second, and third wakeup interrupt commands at oscillating durations of time.

12. The method of claim 10, further comprising:
    asserting the first, second, and third wakeup interrupt commands at regular intervals of time; and
    executing the first, second, and third wakeup interrupt commands at irregular intervals of time.

13. The method of claim 8, wherein the first time period and the second time period each have a duration between 15 microseconds and 1 millisecond.

14. A non-transitory computer readable storage medium on which is embedded one or more computer programs, said one or more computer programs implementing a method for transitioning a processing module of a computing system from an idle state to an active state, said one or more computer programs comprising a set of instructions, that when executed by a processor, cause the processor to:

receive a first wakeup interrupt command to interrupt an idle state of the processing module;

determine a first delay length between receipt of the first wakeup interrupt command and execution of the first wakeup interrupt command;

delay execution of the first wakeup interrupt command until the first delay length has expired;

execute the first wakeup interrupt command;

receive a second wakeup interrupt command to interrupt the idle state of the processing module;

determine a second delay length between receipt of the second wakeup interrupt command and an execution of the second wakeup interrupt command;

delay execution of the second wakeup interrupt command until the second delay length has expired; and execute the second wakeup interrupt command, wherein the first and second delay lengths comprise different durations of time, such that power supply components of the computing system vibrate at a non-periodic frequency.

15. The non-transitory computer readable storage medium of claim 14, said one or more computer programs comprising a set of instructions to:

receive a third wakeup interrupt command to interrupt the idle state of the processing module;

determine a third delay length between receipt of the third wakeup interrupt command and execution of the third wakeup interrupt command;

delay execution of the third wakeup interrupt command until the third delay length has expired; and execute the third wakeup interrupt command, wherein the first, second, and third delay lengths comprise different durations of time.

* * * * *